(12) United States Patent
Bertrand et al.

(10) Patent No.: US 9,760,217 B2
(45) Date of Patent: Sep. 12, 2017

(54) MULTIPLEXING AND DEMULTIPLEXING TO REDUCE DRIVE AND SENSE ELECTRODES FOR SINGLE LAYER TOUCH SENSORS

(71) Applicant: CIRQUE CORPORATION, Salt Lake City, UT (US)

(72) Inventors: Jon Alan Bertrand, Taylorsville, UT (US); Jared G. Bytheway, Sandy, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 17 days.

(21) Appl. No.: 14/206,074

(22) Filed: Mar. 12, 2014

(65) Prior Publication Data

US 2014/0267158 A1    Sep. 18, 2014

Related U.S. Application Data

(60) Provisional application No. 61/777,402, filed on Mar. 12, 2013.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| 8,508,495 | B2* | 8/2013 | Hotelling et al. | 345/174 |
| 2010/0258360 | A1 | 10/2010 | Yilmaz | |
| 2010/0321043 | A1* | 12/2010 | Philipp et al. | 324/686 |
| 2011/0048812 | A1* | 3/2011 | Yilmaz | 178/18.06 |
| 2011/0279409 | A1 | 11/2011 | Salaverry | |
| 2012/0038581 | A1 | 2/2012 | Hotelling | |

* cited by examiner

*Primary Examiner* — Nicholas Lee
*Assistant Examiner* — Duane N Taylor, Jr.
(74) *Attorney, Agent, or Firm* — Morris O'Bryant Compagni Cannon, PLLC

(57) ABSTRACT

A system and method for using data from a single-layer touch sensor to track a single object by using a coded stimulus drive pattern in order to multiplex data onto a sense electrode, measure the sense electrode, and then demultiplexing information from the measurement of the sense electrode in order to obtain position information regarding at least one object on the touch sensor.

11 Claims, 7 Drawing Sheets

MULTIPLEXING AND DEMULTIPLEXING TO REDUCE DRIVE AND SENSE ELECTRODES FOR SINGLE LAYER TOUCH SENSORS

BACKGROUND OF THE INVENTION

Field of the Invention:

This invention relates generally to single layer touch sensors. More specifically, the present invention is a system and method for using data from a single-layer touch sensor to track a single object using a system of multiplexing and demultiplexing of drive and sense electrodes.

Description of Related Art:

When discussing touch sensors, it is noted that there are several different designs for capacitance sensitive sensors. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24.

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

The underlying technology for the CIRQUE® Corporation touchpad is based on capacitive sensors. However, other touchpad technologies can also be used for the present invention. These other proximity-sensitive and touch-sensitive touchpad technologies include electromagnetic, inductive, pressure sensing, electrostatic, ultrasonic, optical, resistive membrane, semi-conductive membrane or other finger or stylus-responsive technology.

The prior art above is directed to a multi-layer touch sensor. It would be an advantage over the prior art to provide a new drive and sense electrode layout that is optimized for a single-layer touch sensor that improves visibility of a display screen disposed underneath the touch sensor.

BRIEF SUMMARY OF THE INVENTION

In a first embodiment, the present invention is a system and method for using data from a single-layer touch sensor to track a single object by using a coded stimulus drive pattern in order to multiplex data onto a sense electrode, measure the sense electrode, and then demultiplexing information from the measurement of the sense electrode in order to obtain position information regarding at least one object on the touch sensor.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should also be understood that the term "touch sensor" may be used interchangeable with the terms touchpad, touchscreen, trackpad, touch panel, touch input device and touch sensitive device throughout this document.

The first embodiment is a single layer touch sensor 30. This means that electrodes used as drive and sense electrodes may be formed on a single substrate 32 or a single layer of a multi-layer substrate. The drive and sense electrodes may be disposed as shown in FIG. 2.

Figure 1:
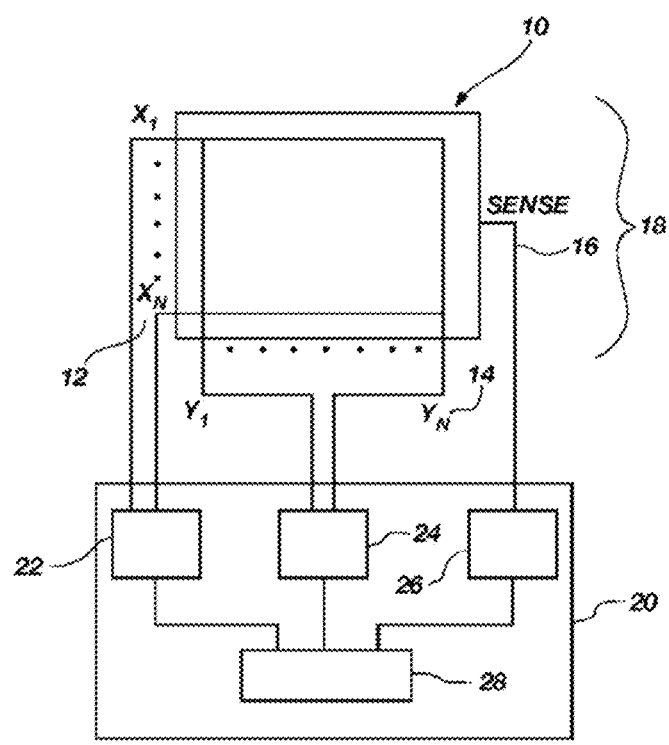
FIG. 1 is a block diagram of operation of a first embodiment of a touchpad that is found in the prior art, and which is adaptable for use in the present invention.
Figure 2:
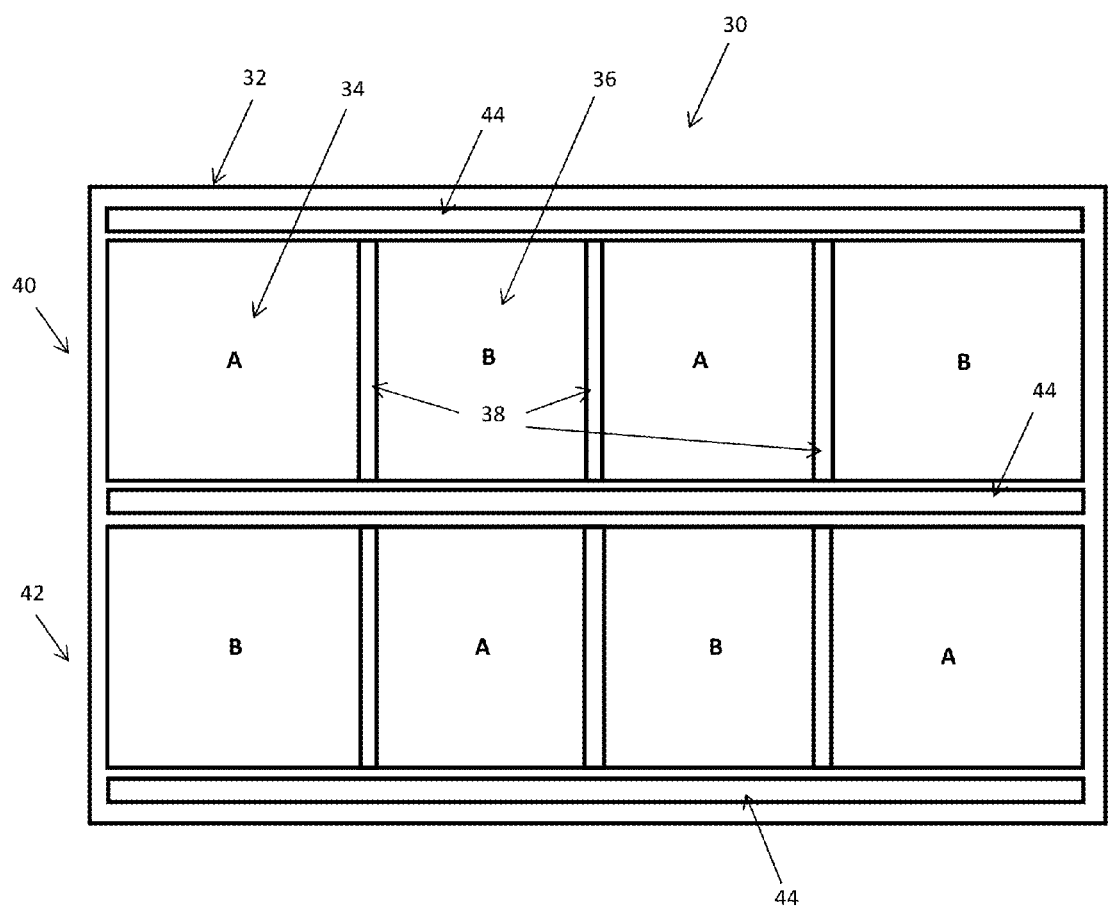
FIG. 2 is a top view of a touch sensor that includes a plurality of touch zones that repeat in a checkerboard pattern so that adjacent touch zones do not interfere with each other.

FIG. 2 is a top view of a touch sensor 30 that may incorporate the features of the first embodiment. FIG. 2 presents the first aspects of the invention before greater detail is introduced in the next figures. One of the first features of the first embodiment is that there may be a plurality of touch zones. The different touch zones are represented in FIG. 2 by touch zones A 34 and B 36. Each of the touch zones 34, 36 includes a plurality of drive and sense electrodes as will be shown later. The touch zones 34, 36 are not buttons, but function as touch sensors in which one or more objects can be detected and the movement tracked. What is important to understand is that for the present invention to function, adjacent touch zones should not be driven at the same time. Thus in FIG. 2, there may be as few as two different types of touch zones A 34 and B 36 that are repeated in the alternating pattern as shown. Using only two different touch zones (A 34 and B 36) reduces the total number of different drive and sense electrodes that are needed to operate the entire touch sensor 30 as will be demonstrated.

FIG. 2 also shows that the touch zones 34, 36 must overlap each other by a single electrode. Thus there is a zone of overlap, or an overlap zone 38 between each of the touch zones 34, 36 on any given row of touch zones. The overlap zones 38 may only be wide enough so that a single electrode is able to overlap.

FIG. 2 shows that on a first row 40 of touch zones 34, 36, the touch zones are alternating in a repeating pattern of ABAB etc. The touch zones 34, 36 are only overlapping where they share a single common sense electrode. On a second row 42 of touch zones underneath the first row 40, there are no shared sense electrodes with the first row of touch zones 34, 36. Drive and sense electrodes in the touch zones 34, 36 are arranged parallel to each other but perpendicular to the direction of each row as will be shown. Therefore, the sense electrode that is shared is only shared between different touch zones 34, 36 on the same row.

Also shown in FIG. 2 are a plurality of routing traces 44 above and below each row of touch zones 34, 36. Therefore, there may need to be sufficient space between the rows of touch zones 34, 36 to enable the routing traces 44 to carry the drive and sense signals to and from the touch zones. It should be understood that the size of the area designated for routing traces is exaggerated for illustration purposes only. The touch sensor defined by the two rows of eight touch zones 34, 36 may appear to function as a single and uninterrupted large touch zone with no gaps in the areas of touch functionality. Thus, even though there are discrete touch zones 34, 36, and there are multiple rows of touch zones, they function together as a single contiguous touch sensor as defined by the outline of the touch sensor 30.

The touch sensor 30 shown in FIG. 2 must perform the steps necessary to detect objects within each of the touch zones 34, 36. Because there are only two touch zones A 34 and B 36 that are repeated and which operate at different times in order to not interfere with each other, and which are repeated over the surface of the touch sensor 30, the process only needs to be performed twice, a first time and simultaneously for all of the A 34 touch zones, and then a second time and simultaneously for all of the B 36 touch zones.

While only two rows 40, 42 of touch zones 34, 36 are shown in FIG. 2, the total number of rows and the total number of touch zones 34, 36 within each row may be increased to obtain the desired size of touch sensor 30. What is important is that adjacent touch zones 34, 36 are always different, or in other words, are activated at different times so that the shared sense electrode is only being used by a single touch zone at a time. Therefore, no A 34 touch zones are adjacent to any other A touch zones in the same row or in an adjacent row, above or below. The touch zones 34, 36 therefore form a checkerboard pattern in the touch sensor 30.

Figure 3:
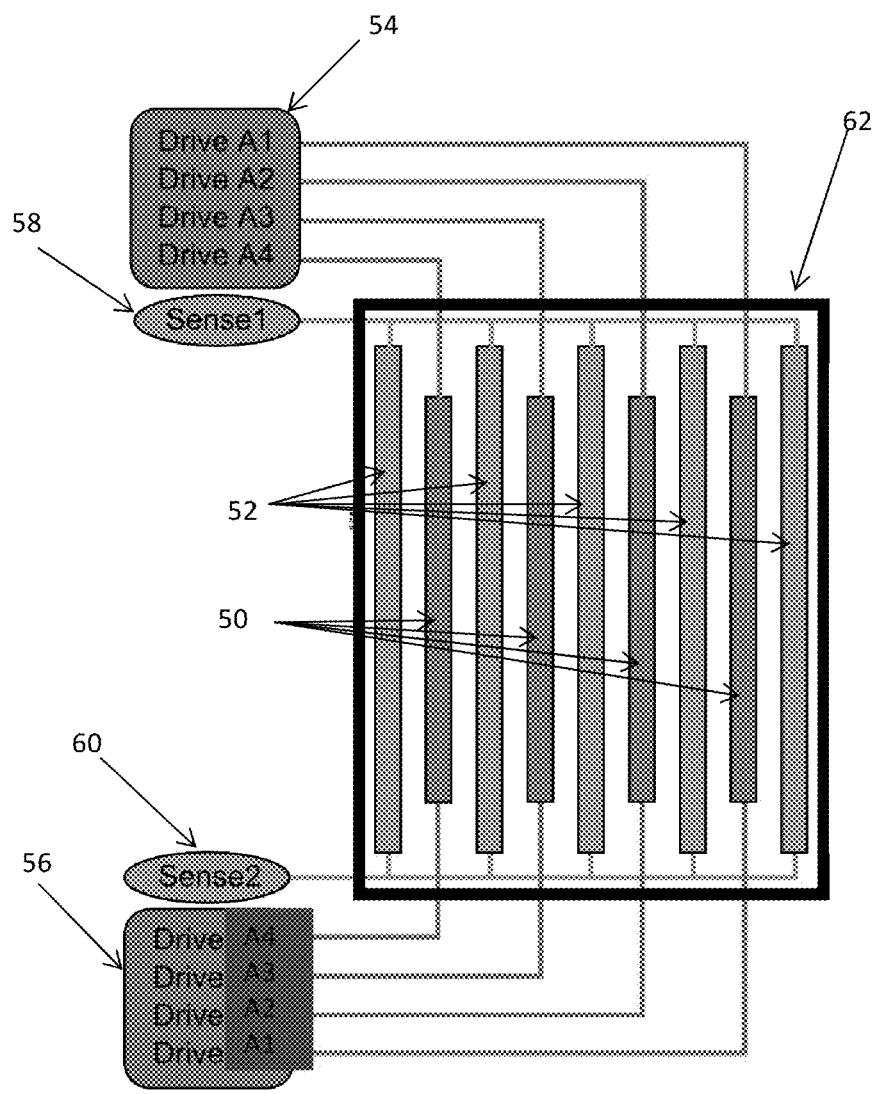
FIG. 3 is a close-up schematic view of a single touch zones showing drive and sense electrodes, and the drive and sense traces to the electrodes.

FIG. 3 is a top schematic view of detail within a single touch zone 34 or 36. This can be an A 34 or a B 36 touch zone because they are identical internally and only differ in the external connections to the drive traces and sense traces to the touch zones 34, 36. The number of drive electrodes and sense electrodes within each touch zone is a function of the stimulus patterns that are used to drive the drive electrodes. Accordingly, the number of drive electrodes may vary in accordance with the size of the touch zone 34, 36.

In this example shown in FIG. 3, there are four drive electrodes 50 and five sense electrodes 52. The drive electrodes 50 may be driven from each end of the drive electrodes or from a single end. The sense electrodes 52 may be measured from each end of the sense electrodes or from a single end. Thus, there are routing traces for both the drive and sense electrodes 50, 52 on each end of the drive and sense electrodes.

The drive and sense electrodes 50, 52 are always alternating within each touch zone 34, 36. However, the touch zones 34, 36 must always begin and end with a sense electrode 52, so there is always one more sense electrode than drive electrode 50 in each touch zone 34, 36. Thus there are always n drive electrodes 50 and n+1 sense electrodes 52 in each touch zone 34, 36.

The number of drive electrodes 50 is not random within each touch zone 34, 36, but rather they are a function of the stimulus patterns being used. The stimulus patterns may be selected from a series of Hadamard patterns or other coded patterns. In the first embodiment a subset of ordered Hadamard patterns are used for stimulus patterns, which are known as Walsh patterns.

The touch sensor 30 may use a specific Hadamard pattern. The dimensions of a Hadamard pattern are limited to a square matrix having a number of elements from the sequence 1, 2, 4, 8, 12, 16, 24, etc. Hadamard dimensions or patterns of 1 and 2 are not useful in this first embodiment. Therefore, in order to keep the number of routing traces small so that multiple rows of touch zones 34, 36 do not have to be spaced far apart, a Hadamard dimension of 4 is used, resulting in a selection of 4 drive electrodes.

For a Hadamard pattern of dimension 4, the Walsh stimulus or drive patterns used by the present invention are shown in the following Walsh matrix.

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

The number 1 in the drive pattern above may be a positive toggling event and the −1 may be a negative toggling event. It is not necessary to measure the first drive pattern of all "1"s, so if the measurement system cannot measure that large of an unbalanced signal, the measured result may instead be inferred at a later point in this process. The other three drive patterns are measured because they are balanced, or have an equal number of positive and negative toggling events.

It is noted that the all "1"s pattern is still useful because it may be used to determine if anything is present on the touch sensor. If there is no signal, then no other patterns need to be used because there is nothing to detect. Therefore, this first pattern may be useful as a test for objects before driving the more complicated and longer sequence of patterns used to locate the exact position an object on the touch zone 34, 36.

As shown in FIG. 3, there are two drive buses 54, 56 of n drive electrodes 50 each, with one drive bus 54 above and one drive bus 56 below the touch zone 34, 36. There are also two sense buses 58, 60, with one sense bus above 58 and one sense bus below 60. Touch zones 34, 36 that are physically adjacent by row or column are connected to different drive buses as will be shown in later figures.

The selection of the drive patterns enables the present invention to encode or multiplex information regarding the amount of signal that is present on a sense electrode 58, 60 at multiple locations along the length of the electrode. Thus, instead of having to toggle each drive electrode 50 individually, they can all be toggled simultaneously and the information is multiplexed together onto a single sense electrode bus 58, 60.

After measuring the sense electrode bus 58, 60, the information is then decoded or demultiplexed using techniques to be explained and which are well known to those skilled in the art. Thus, by mathematically determining how the information is multiplexed onto a single sense electrode bus 58, 60, the information may be mathematically demultiplexed to obtain an object's location relative to the location of each drive electrode 50.

FIG. 3 shows that the sense electrodes 52 are all electrically coupled together at the top sense electrode bus 58 and the bottom sense electrode bus 60. This specific layout is only used when there is a single touch zone in the touch sensor 30. The differences that arise when there are multiple touch zones will be shown in the following figures.

For the simple touch sensor 62 shown in FIG. 3, the touch sensing process may be as follows. First, the drive pattern is simultaneously applied to each end of the drive electrodes 50. Thus if the second drive pattern is being applied, the drive electrode 50 coupled to Drive A1 has a 1 or positive toggle event at each end of the drive electrode. Drive A2 has a 1 or positive toggle event at each end of the drive electrode 50. Drive A3 has a −1 or negative toggle event at each end of the drive electrode 50. Drive A4 has a −1 or negative toggle event at each end of the drive electrode 50.

A multiplexed reading or measurement is recorded from Sense1 58 and Sense2 60 for each of the four drive patterns. The measurements are then demultiplexed to extract the desired touch information as is known to those skilled in the art of demultiplexing information. For example, the signals may be demultiplexed using a process that uses the dot product of the drive pattern and the multiplexed measurement that was received from the drive pattern.

The demultiplexed readings may then be processed in a manner known to those skilled in the art to obtain a full image of all objects that are in contact with the touch sensor 62. In this case, the single touch zone is also the complete touch sensor 62.

In this first embodiment, only a single finger may be detected on each drive or sense electrode. A different technique must be used to detect two fingers on each drive or sense electrode. This limitation is a function of the same drive signal being driven simultaneously on each end of the drive electrodes 50.

The first embodiment is directed to a single touch zone 34, 36 in a touch sensor 62. The second embodiment is directed to the more complicated scenario that arises when there are multiple touch zones 34, 36 in a single touch sensor 30.

Figure 4:
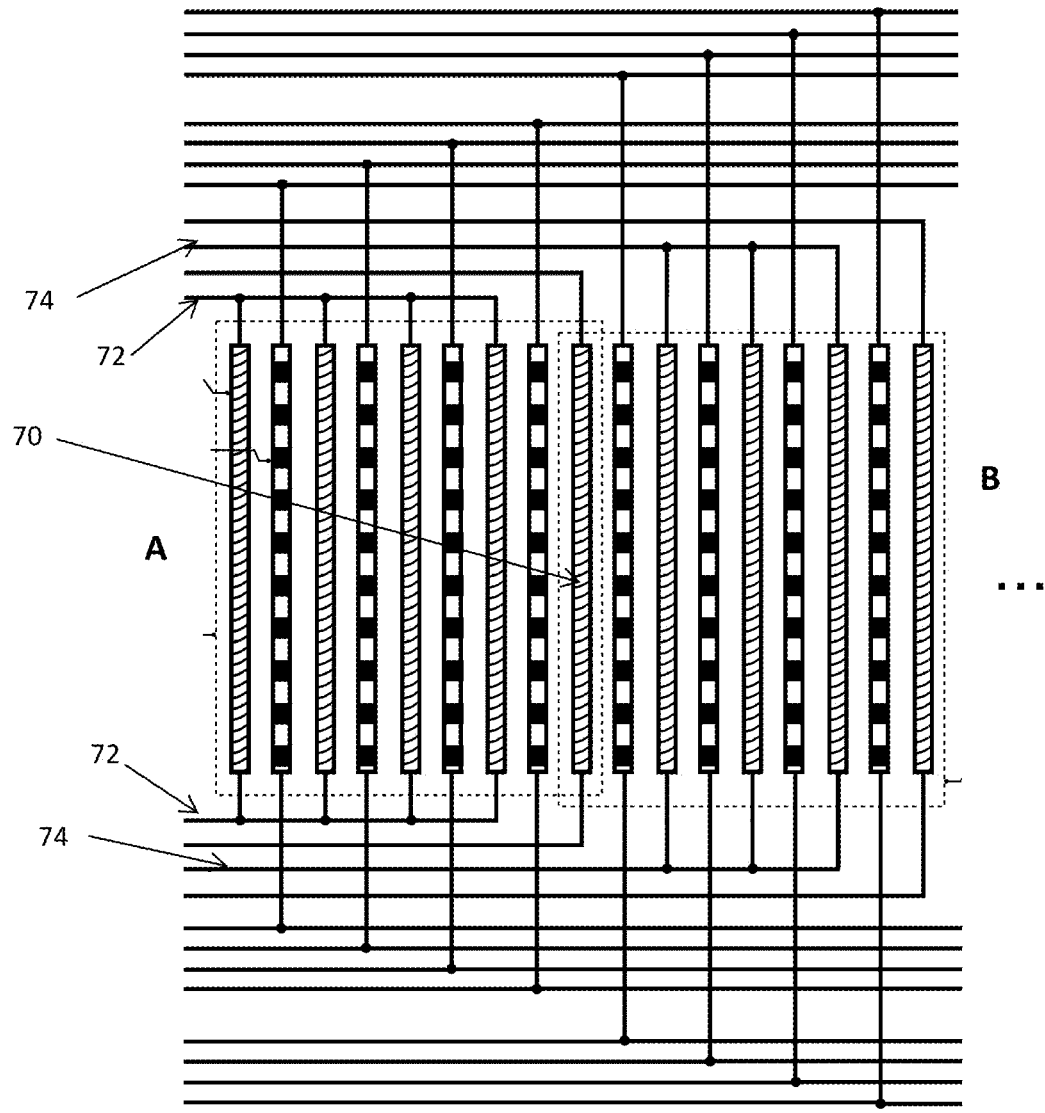
FIG. 4 is a schematic view of electrodes and routing traces that shows the differences in the routing of traces when there are two adjacent touch zones that share a common but individually addressable sense electrode.

FIG. 4 is a top schematic view of a touch sensor having two different and overlapping touch zones, A 34 and B 36. An important aspect of a multi touch zone design is that the sense electrode 70 between two adjacent touch zones is always shared. The touch zones A 34 and B 36 thus overlap in the center of the electrodes as shown in FIG. 4. The sense electrode 70 may be shared because only one touch zone, A 34 or B 36, is active at any given time. Therefore, in order for the sense electrode 70 to be shared, it must also be individually addressable so that touch zone A 34 can measure the shared electrode 70 when needed, and the same electrode 70 can be measured when touch zone B 36 is active. Thus, the shared sense electrode 70 is not electrically tied to the other sense electrodes 72 that are tied together in touch zone A 34, or the other sense electrodes 74 that are tied together in touch zone B 36.

Additional touch zones may be added to the touch sensor by alternating the use of the drive routing traces in each subsequent touch zone in a specific row so that the next touch zone after B is another A touch zone, followed by a B touch zone, followed by another A touch zone, etc.

It is an aspect of the present invention that the reason for performing multiplexing and demultiplexing of the touch data on the sense electrodes of the touch sensor is a result of creating a plurality of discrete touch zones to create a larger touch sensor. By creating the discrete touch zones, it is therefore possible to reduce the number of routing traces that are needed to drive and sense the touch zones.

FIG. 4 illustrates certain aspects of a multi touch zone touch sensor. Touch zones that are physically adjacent by row or column should be connected to different drive and sense buses. The center-most sense electrodes between adjacent touch zones in a row are always tied together to a single bus line, while any shared sense electrode at a boundary between touch zones (in a row) is always separately addressable so that it can function as a sense electrode for either of the adjacent touch zones. The very first touch zone and the very last touch zone on a row also have an outer sense electrode that does not need to be individually addressable, but is instead grouped together with the other sense electrodes of the touch zone. It is only when a sense electrode is at a boundary between adjacent touch zones that it must be individually addressable.

Another aspect of the multi touch zone touch sensor is that while one drive bus is active, the other bus of the adjacent touch zone may be held at ground in order to reduce noise and interference with the active touch zone.

Figure 5:
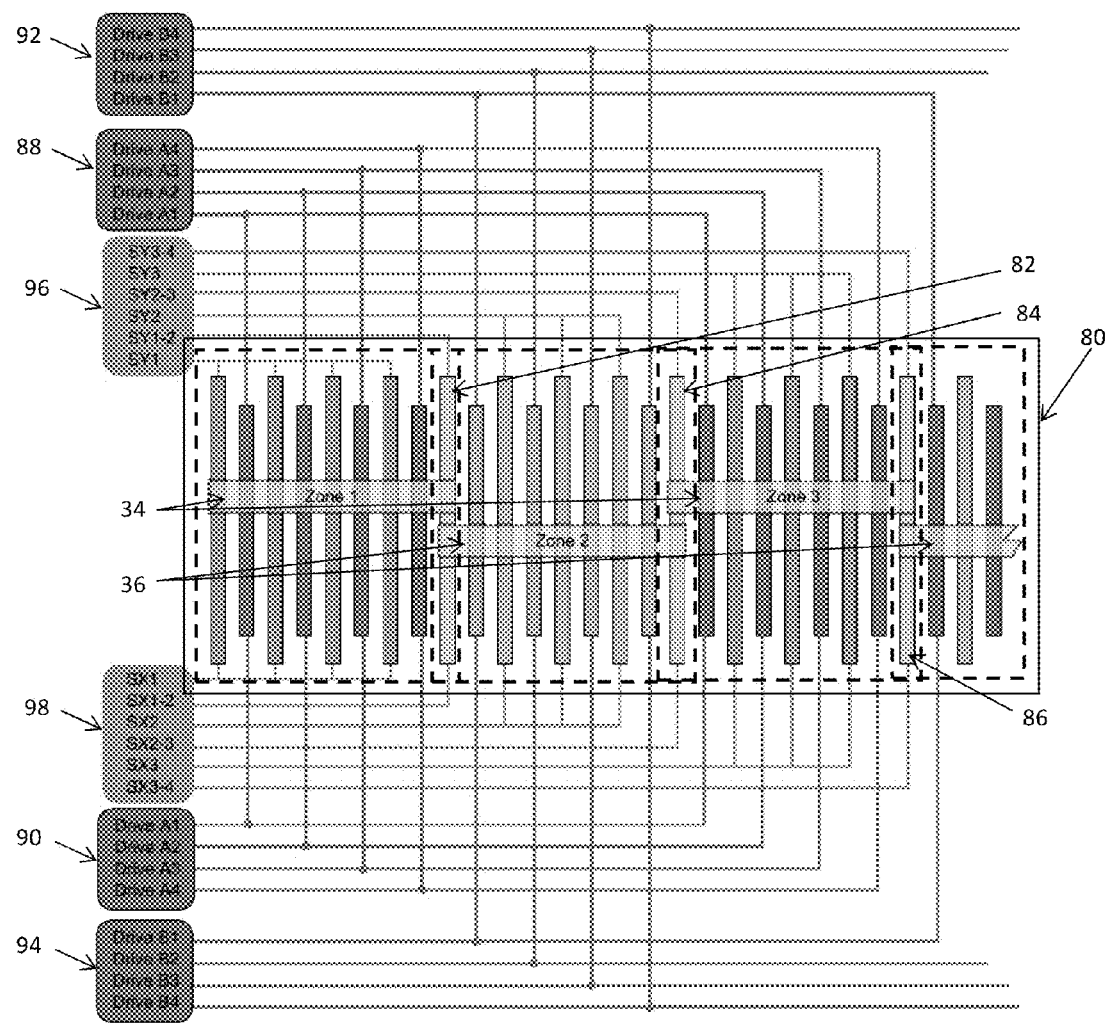
FIG. 5 is a schematic view of electrodes and routing traces that shows how multiple touch zones can be disposed on a same row.

FIG. 5 is a top schematic view of a touch sensor and generally shown as 80 having at least four touch zones 34, 36, with the fourth touch zone only partially visible. The four touch zones 34, 36 are in a single row. Zones 1 and 3 may be the A touch zones 34, and Zones 2 and the partially visible Zone 4 may be the B touch zones 36, or vice versa. Notice that the shared sense electrodes 82, 84, 86 between zones 1 and 2, 2 and 3, and 3 and 4 are individually addressable. The shared sense electrodes 82, 84, 86 must be individually addressable so that they can be used with the touch zone 34, 36 on either side.

Some observations to make are that zone 1 and zone 3 share the same drive electrodes as shown at 88 and 90. The same drive signals may be driven on the drive electrodes 88, 90 from both ends at the same time or from one end or the other. Zone 2 and zone 4 also share the same drive electrodes as shown at 92 and 94.

One aspect of the first embodiment is determining the position information of a finger on the touch sensor 80 may be determined. For example, the first embodiment may measure the amount of charge that is present on a sense electrode 96, 98 by measuring the charge at each end. Determining the position of a finger thus may be accomplished by treating the sense electrode 96, 98 as a voltage divider. By dividing the amount of charge at a first end of the sense electrode 96, 98 by the sum of the charge at both ends of the sense electrode may give the position of the finger relative to the first end. Similarly, by dividing the amount of charge at a second end of the sense electrode by the sum of the charge at both ends of the electrode may give the position of the finger relative to the second end.

One aspect of the first and second embodiments that may need to be addressed is the issue of DC voltage offset. It may be remembered that for the Walsh matrix of drive patterns, it is not necessary to take the measurement for the imbalanced first pattern of all "1"s. By not measuring when the drive pattern comes from the all "1"s row of the Walsh matrix, the result may be a zero DC voltage offset because the actual DC voltage offset of the zone is lost. The correct DC offset may need to be restored to the zone after the measurement is made. However, there may be no way to restore the true DC voltage offset. Any DC voltage offset restoration may need to rely on the idea that at least one drive electrode has no signal because of no finger interaction. That drive electrode may have the most positive or maximum signal. It may be possible to find the max signal and then subtract it from all the other signals to obtain the DC voltage offset. Subtracting the max signal will inject noise directly into the result and reduce the signal to noise ratio (SNR).

Restoring the DC voltage offset may not work for touch sensors where multiple fingers may cover an entire touch zone.

Another aspect of the embodiments is that it may be necessary to allow for proper signal overhead. Having proper signal overhead means allowing for a large signal to be present on a sense electrode without railing or chopping off a valid portion of a signal. If more than one sense electrode has a signal on it, then a drive pattern may exist that adds those signals during the pattern measurement phase. This addition of signals may rail the signal on the sense electrode being measured. Accordingly, it may be necessary to plan the size of the touch sensor, the gain setting and the total number of possible detectable fingers to make sure that the sense electrode is not overwhelmed by added signals and becoming railed.

A demultiplexed or final results data array may be defined in the embodiments of the present invention as the dot product of a multiplexed or measured results data array and the Walsh matrix drive patterns. A two dimensional array works well for holding the multiplexed and demultiplexed results, where the dimensions are [side, row].

The process for applying drive signals, taking measurements and then obtaining position information for a multi-zone touch sensor may be as follows. The first step is to drive each Walsh drive pattern on the A touch zones 34 while holding the B touch zones 36 at ground. Using FIG. 5 as an example, this means driving the A drive electrodes 88, 90 while holding the B drive electrodes 92, 94 at ground. The next step is to collect the multiplexed results from the sense electrodes 96, 98. The results may be stored in a results array. It may also be possible to store them in a manner that enables the dot product to be performed more easily, but this is not necessary.

The next step may be to drive each Walsh drive pattern on the B touch zones 36 while holding the A touch zones 34 at ground. Collecting the results in the multiplexed results data array such that the dot product can be performed easily. Again using FIG. 5 as an example, this means driving the B drive electrodes 92, 94 while holding the A drive electrodes 88, 90 at ground. The next step is to collect the multiplexed results from the sense electrodes 96, 98. The results may be stored in a results array.

For each touch zone 34, 36 the next step is to demultiplex by using a dot product. The next step may be to provide compensation if necessary. The final step is to recreate a DC voltage offset in each touch zone 34, 36 by taking the high value in the touch zone and subtracting it from all the other measurements in the touch zone.

((The next step is to subtract the compensation values from the multiplexed results data in the arrays.))

In an alternative embodiment, it may be desirable to evaluate all incoming measurement data so that "bad" or railed results are not used.

Some aspects of the embodiment include being able to share drive routing traces to reduce the total number of routing traces that need to be used. However, each touch zone 34, 36 needs to have unique routing traces for its sense electrodes, while the shared sense electrode must be uniquely addressable. In summary, for a single axis multiplexing-demultiplexing design, at least two sets of drive electrodes are needed for the touch zones A 34 and B 36. In the single axis design, both ends of the drive electrodes receive the same stimulus. As a touch zone is driven, all adjacent touch zones sharing a side may need to be grounded or they may modulate signal into the measurements, resulting in demodulation results showing incorrect locations of fingers. Once all the A touch zone 34 and the B touch zone 36 readings or measurements are recorded, the process is to demultiplex, compensate, and then repair the DC offset for all the touch zones 34, 36.

The embodiments above are directed to the sensing of a single finger on any given electrode of the touch zone. However, in order to detect a second finger on each of the electrodes in a touch zone, the drive patterns may need to be modified.

Figure 6:
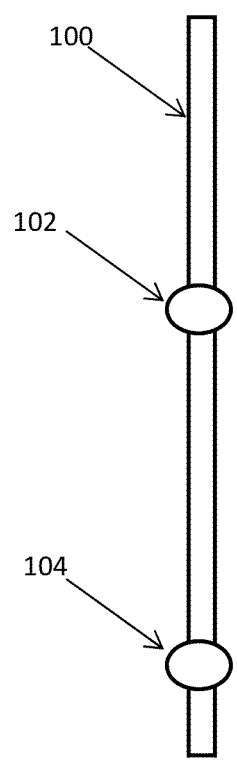
FIG. 6 is a top view of a single sense electrode, a first finger, and a second finger to illustrate multi-touch on a single sense electrode.

FIG. 6 is an illustration of how the present invention is used for simultaneous multi-touch detection. A single finger may simultaneously be detected on or near each of the sense electrodes in a touch zone 34, 36. Thus, if there are six sense electrodes in a single touch zone 34 or 36, six fingers may be simultaneously detected. However, if there is more than one finger on or near a sense electrode, the present invention is limited to the simultaneous detection of two fingers.

FIG. 6 shows a single sense electrode 100, a first finger 102, and a second finger 104. Using the process described above, the present invention may determine the length of the sense electrode 100 until reaching the first finger 102 and the second finger 104 as a ratio of the total length of the sense electrode. In other words, by determining the strength of the signal on the sense electrode 100 from each end, it is possible to determine the position of the fingers 102, 104 as a function of the measured signal strength as compared to the total strength.

Figure 7:
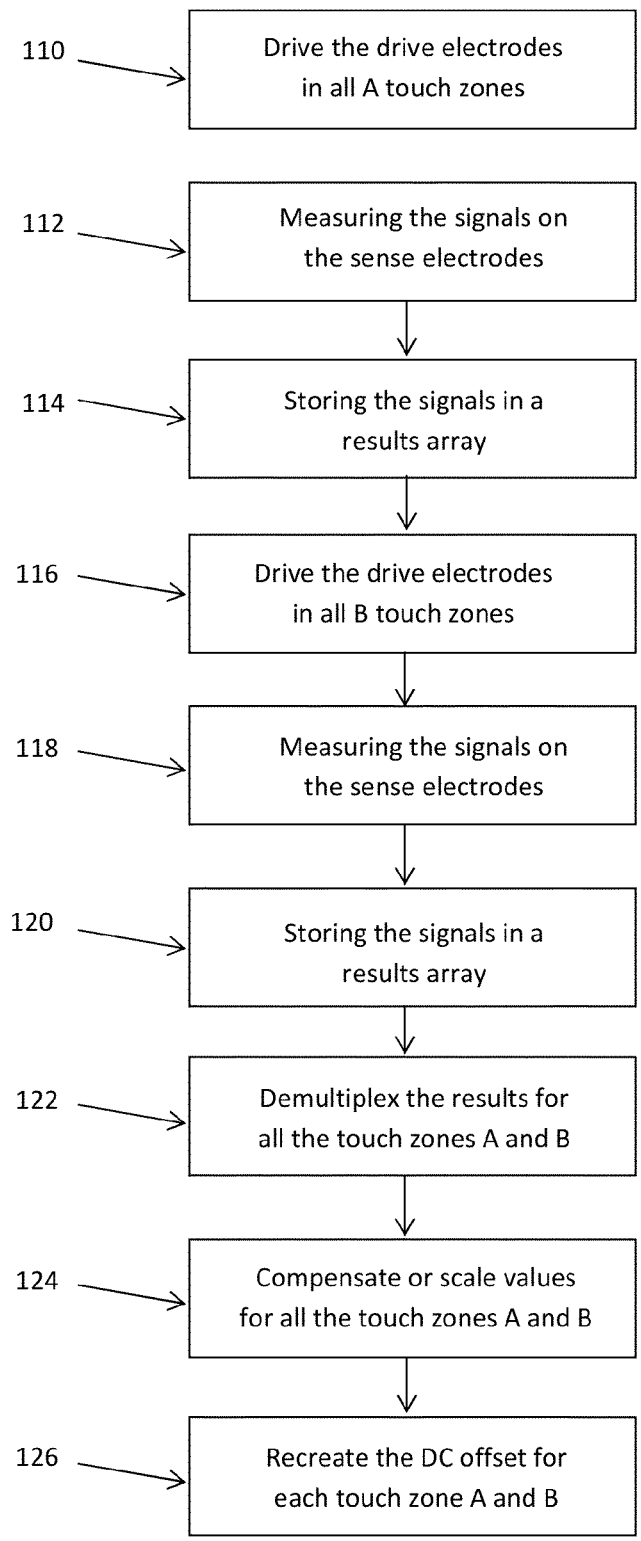
FIG. 7 is a flowchart of a first embodiment of the present invention.

FIG. 7 is a flowchart that illustrates an example of the steps that may be followed in order to multiplex and demultiplex touch data from the touch sensor 80. This is an example only, and should not be considered as limiting the invention.

Step one in item 110 is to drive each Walsh pattern on A drive electrodes 88, 90 while holding the B drive electrodes 92, 94 at ground, measuring the signals on the sense electrodes 96, 98 in item 112 and collecting the multiplexed results and storing them in a results array in item 114 and preferably but not necessarily ordered such that the dot product can be easily performed.

The next step in item 116 is to drive each Walsh pattern on the B drive electrodes 92, 94 while holding the A drive electrodes 88, 90 at ground, measuring the signals on the sense electrodes 96, 98 in item 118 and collecting the multiplexed results and storing them in a results array in item 120 and preferably ordered such that the dot product can be easily performed.

For each touch zone 34, 36, the next step in item 122 is to perform the dot product to produce the demultiplexed results for all the touch zones A and B.

The next step in item 124 is to subtract compensation values from the multiplexed data in the results arrays or to scale the value, depending on what is needed.

The next step in item 126 is that for each touch zone 34, 36, the DC voltage offset is recreated by taking the high value in each touch zone and subtracting it from all the other readings in the touch zone.

The following is an example of the steps that are executed in order to perform multiplexing and demultiplexing of information. The example shown is for a 4×1 sensor, where a stimulus pattern is being driven on four drives electrodes and a measurement is being made on just one sense electrode of a single touch zone. This process may have to be repeated in order to obtain the information for each sense electrode when there are multiple sense electrodes in a touch zone.

Table 1 shows that the first step is to multiplex data onto the sense electrode by stimulating the drive electrodes D1, D2, D3 and D4. The drive electrodes are driven using the drive patterns shown in table 1. The purpose is to determine what signal is on the sense line relative to each of the drive electrodes, so the signal on the sense electrode is unknown. However, Table 1 shows actual values on the sense line. These are the values that will eventually be obtained but are not yet known.

TABLE 1

|  | Drive | | | |
| --- | --- | --- | --- | --- |
|  | D1 | D2 | D3 | D4 |
| Sense Drive Patterns | −75 | −500 | −10 | 0 |
| Pattern0 | 1 | 1 | 1 | 1 |
| Pattern1 | 1 | 1 | −1 | −1 |
| Pattern2 | 1 | −1 | −1 | 1 |
| Pattern3 | 1 | −1 | 1 | −1 |
| CalcMeasurements |  |  |  |  |
| Pattern0 | −75 | −500 | −10 | 0 |
|  | −75 | −500 | 10 | 0 |
|  | −75 | 500 | 10 | 0 |
|  | −75 | 500 | −10 | 0 |

There are three possible drives states on the drive electrodes: positive toggle or +1, negative toggle or −1, and ground. A +1 in the drive patterns may be a positive toggle, a −1 may be a negative toggle, and a 0 may indicate a grounding of the drive electrode.

The CalcMeasurements array shows the measured values that are obtained in this example. The Measured values shown in Table 2 are the sum of the values in each row of the CalMeasurements array in TABLE 1 that are measured in each row.

TABLE 2

| Measured Values |
| --- |
| −585 |
| −565 |
| 435 |
| 415 |

The next step is to demultiplex the desired data from the sense electrode. Table 3 shows that the Demultiplex Array has the same values as the Multiplex array used to drive signals on the drive electrodes.

TABLE 3

| Measured Values | Demultiplex Array (same as Multiplex Array) | | | |
| --- | --- | --- | --- | --- |
| −585 | 1 | 1 | 1 | 1 |
| −565 | 1 | 1 | −1 | −1 |
| 435 | 1 | −1 | −1 | 1 |
| 415 | 1 | −1 | 1 | −1 |
| Intermediate products for the dot product | | | | |
|  | −585 | −585 | −585 | −585 |
|  | −565 | −565 | 565 | 565 |
|  | 435 | −435 | −435 | 435 |
|  | 415 | −415 | 415 | −415 |

TABLE 3-continued

| | | | | |
|---|---|---|---|---|
| −300 | −2000 | −40 | 0 | Demultiplexed Values |
| −75 | −500 | −10 | 0 | Scaled, Demultiplexed Values |

TABLE 3 also shows the intermediate products for the dot product process. The column of measured values are paired with each column from the Demultiplex array and then multiplied. The sum of each column is obtained in the Demultiplexed Values row in TABLE 3 using the dot product as shown in TABLE 4. The values are 4 times larger than they should be. This information may then be properly scaled by dividing by 4 to obtain the final Scaled Demultiplexed Values row, which corresponds precisely to the information that was predicted to be on the sense electrode in TABLE 1.

TABLE 4

| Measured Values | Multiplex/Demultiplex patterns | | | |
|---|---|---|---|---|
| M0 | P0.0 | P0.1 | P0.2 | P0.3 |
| M1 | P1.0 | P1.1 | P1.2 | P1.3 |
| M2 | P2.0 | P2.1 | P2.2 | P2.3 |
| M3 | P3.0 | P3.1 | P3.2 | P3.3 |

| Demultiplexed values | | | |
|---|---|---|---|
| M0 * P0.0 + | M0 * P0.1 + | M0 * P0.2 + | M0 * P0.3 + |
| M1 * P1.0 + | M1 * P1.1 + | M1 * P1.2 + | M1 * P1.3 + |
| M2 * P2.0 + | M2 * P2.1 + | M2 * P2.2 + | M2 * P2.3 + |
| M3 * P3.0 | M3 * P3.1 | M3 * P3.2 | M3 * P3.3 |

One observation is that as a result of the first drive pattern not being measured, a Dimension −1 multiplexed measurement may be obtained for each touch zone. The results stored in the multiplexed or measured results data array will therefore have fewer elements than a final demultiplexed or final results data array.

In one possible alternative embodiment, one method of simplifying the process is to use a version of the Hadamard matrix that is rotated so that it presents a column of bits that may be processed more easily when performing the dot product calculations. Thus, the drive patterns of 1100, 1001 and 1010 may become rotated to the columns of 111, 100, 001, 010.

It is noted that one purpose of the present invention is to enable a single layer touch sensor to be created. It has been the case that the inks or other materials used for the electrodes and the routing traces may have visibly interfered with a display screen underneath when the touch sensor was used in a touch screen. The present invention eliminates the need for having two substrate layers or the need for overlapping routing traces or electrodes, thereby simplifying the design of the touch sensor and increasing visual clarity.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for tracking at least one object on a single layer touch sensor, said method comprising:
providing alternating touch zones comprised of a plurality of drive and sense electrodes, wherein there are at least two touch zones A and B on each row of a touch sensor, wherein no A touch zones are disposed adjacent to each other on a same row or on adjacent rows, wherein no B touch zones are disposed adjacent to each other on a same row or on adjacent rows;
driving all of the A touch zones while the B touch zones are grounded so as not to interfere with the A touch zones, and then driving all of the B touch zones while the A touch zones are grounded, wherein coded drive patterns multiplex data onto the plurality sense electrodes from the n plurality of drive electrodes;
measuring a signal on the plurality of sense electrodes;
demultiplexing data from the signal measured on the plurality of sense electrodes in order to obtain position information regarding at least one object on the touch sensor.

2. The method as defined in claim 1 wherein the method further comprises scaling the demultiplexed data from the signal measured on the plurality of sense electrodes.

3. The method as defined in claim 2 wherein the method further comprises recreating a DC voltage offset in each touch zone by taking a high value a touch zone and subtracting it from all the other measurements in that touch zone.

4. The method as defined in claim 3 wherein the method further comprises being able to detect a plurality of objects in each touch zone, but at most two objects on any one of the plurality of sense electrodes.

5. The method as defined in claim 1 wherein the method further comprises providing n drive electrodes and n+1 sense electrodes in each touch zone, the sense and drive electrodes being in a same plane, parallel to each other and alternating in order, beginning and ending with a sense electrode, providing a first sense trace coupled at a first edge to all of the plurality of sense electrodes on a first end and providing a second sense trace coupled at a second edge to all of the plurality of sense electrodes on a second end, providing a plurality of first drive traces, each of the plurality of drive electrode coupled to a different one of the first drive traces at a first edge, and providing a plurality of second drive traces, each of the plurality of drive electrodes coupled to a different one of the second drive traces at a second edge.

6. A single layer touch sensor for tracking at least one object, said single layer touch sensor comprised of:
a first touch zone comprised of a plurality of drive and sense electrodes, wherein there are n drive electrodes and n+1 sense electrodes, the sense and drive electrodes being in a same plane, parallel to each other and alternating in order, beginning and ending with a sense electrode;
a first sense trace coupled at a first edge to all of the plurality of sense electrodes on a first end;
a second sense trace coupled at a second edge to all of the plurality of sense electrodes on a second end;
a plurality of first drive traces, each of the plurality of drive electrode coupled to a different one of the first drive traces at a first edge; and
a plurality of second drive traces, each of the plurality of drive electrodes coupled to a different one of the second drive traces at a second edge; and
a second touch zone configured like the first touch zone and disposed adjacent to the first touch zone such that the plurality of drive electrodes and the plurality of sense electrodes of the first and second touch zones are all parallel to each other, wherein a sense electrode at a boundary between the first and second touch zones is a shared sense electrode that is independently addressable such that the shared sense electrode can be used by either the first or second touch zones which share it, and wherein the first and second touch zones are alternated on each row of a touch sensor such that no active touch zone is adjacent to another touch zone on a same row or on an adjacent row, wherein an active touch zone has drive signals applied, and an inactive touch zone has electrodes that are grounded so as not to interfere with measurements on the active touch zone.

7. The single layer touch sensor as defined in claim 6 wherein the single layer touch sensor is further comprised of a different set of drive traces and a different set of sense traces for adjacent touch zones.

8. A method for providing a single-layer touch sensor for tracking at least one object, said method comprised of:
providing a first touch zone comprised of a plurality of drive and sense electrodes, wherein there are n drive electrodes and n+1 sense electrodes, the sense and drive electrodes being in a same plane, parallel to each other and alternating in order, beginning and ending with a sense electrode, providing a first sense trace coupled at a first edge to all of the plurality of sense electrodes on a first end and providing a second sense trace coupled at a second edge to all of the plurality of sense electrodes on a second end, providing a plurality of first drive traces, each of the plurality of drive electrode coupled to a different one of the first drive traces at a first edge, and providing a plurality of second drive traces, each of the plurality of drive electrodes coupled to a different one of the second drive traces at a second edge;
providing a second touch zone configured like the first touch zone and disposed adjacent to the first touch zone such that the plurality of drive electrodes and the plurality of sense electrodes of the first and second touch zones are all parallel to each other, wherein a sense electrode at a boundary between the first and second touch zones is a shared sense electrode that is independently addressable such that the shared sense electrode can be used by either the first or second touch zones which share it, and wherein the first and second touch zones are alternated on each row of a touch sensor such that no active touch zone is adjacent to another touch zone on a same row or on an adjacent row, wherein an active touch zone has drive signals applied, and an inactive touch zone has electrodes that are grounded so as not to interfere with measurements on the active touch zone driving the drive electrodes using a coded pattern in order to multiplex data onto the plurality of sense electrodes;
measuring a signal on the plurality of sense electrodes; and
demultiplexing information from the signal measured on the plurality of sense electrodes in order to obtain position information regarding at least one object on the touch sensor.

9. The method as defined in claim 8 wherein the method further comprises providing a different set of drive traces and a different set of sense traces for adjacent touch zones.

10. The method as defined in claim 8 wherein the method further comprises scaling the demultiplexed information from the signal measured on the plurality of sense electrodes.

11. The method as defined in claim 10 wherein the method further comprises recreating a DC voltage offset in each touch zone by taking a high value in each of the touch zones and subtracting it from all the other measurements in each of the touch zones.

* * * * *